(12) United States Patent
Nagao (10) Patent No.: US 6,430,681 B1
(45) Date of Patent: Aug. 6, 2002

(54) DIGITAL SIGNAL PROCESSOR

(75) Inventor: Fumiaki Nagao, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/336,075

(22) Filed: Jun. 18, 1999

(30) Foreign Application Priority Data

Jun. 19, 1998 (JP) ............................................ 10-172976

(51) Int. Cl.$^7$ ........................ G06F 9/302; G06F 9/305; G06F 9/40; G06F 9/44
(52) U.S. Cl. ...................... 712/233; 712/221; 712/222; 712/223; 712/237; 712/35; 708/490; 708/508
(58) Field of Search ................................ 711/214, 211, 711/213, 216, 215, 209, 153, 148, 149, 123; 708/670, 508, 684, 705, 490, 184; 710/9, 14, 113, 29, 129, 37, 128, 131; 712/29, 38, 30, 137, 31, 35, 36, 222, 221, 21, 22, 223, 233, 237, 234, 248

(56) References Cited

U.S. PATENT DOCUMENTS 4,245,327 A  * 1/1981 Moriya et al. ............... 708/670
5,450,553 A  * 9/1995 Kitagaki et al. ............. 711/214

* cited by examiner

Primary Examiner—Daniel H. Pan
(74) Attorney, Agent, or Firm—Cantor Colburn LLP (57) ABSTRACT

In a digital signal processor having an improved arithmetic processing efficiency, there is provided in parallel a first ROM for storing branch commands and a second ROM for storing arithmetic commands. The ROMs are connected to a branch command decoder and an arithmetic command decoder, respectively. Operations of a first memory control circuit and a second memory control circuit are controlled in response to instructions from the branch command decoder, while operations of an arithmetic circuit are controlled in response to instructions from the arithmetic command decoder. By processing the branch commands and the arithmetic commands in parallel, the operation efficiency of the arithmetic circuit is enhanced.

6 Claims, 7 Drawing Sheets

FIRST ROM

| PA1 | BRANCH COMMAND |
|---|---|
| 0 | PS<= 3 |
| 1 | PS<= 8 |
| 2 | start PA2= 0 |
| 3 | DA1 = 0 |
| 4 | DA2 = 0 |
| 5 | PA2 = 1 |
| 6 | PS<= 3 |
| 7 | start PA2 >= 4 |
| 8 | DA1 = 2 |
| 9 | DA2 = 3 |
| 10 | PA2 = 1 |
| 11 | PS<= 13 |
| 12 | start PA2 >= 4 |
| 13 | DA1 = 0 |
| 14 | DA2 = 0 |
| 15 | PA2 = 8 |
| 16 | PS<= 8 |
| 17 | start PA2 >= 13 |

Fig. 5A

SECOND ROM

| PA2 | ARITHMETIC COMMAND |
|---|---|
| 0 | wait |
| 1 | R1 = M1[DA1], R2 = M2[DA2] |
| 2 | R3 = R1 * R2, R1 = X(n), R2=M2[++DA2], M1[DA1]=X(n) |
| 3 | R3 = R1 * R2, R4 += R3, R1=M1[++DA1], R2=M2[++DA2] |
| 4 | R3 = R1 * R2, R4 += R3 |
| 5 | R4 += R3 |
| 6 | M1[DA1]=R4 |
| 7 | wait |
| 8 | nop |
| 9 | nop |
| 10 | nop |
| 11 | nop |
| 12 | nop |
| 13 | nop |
| 14 | wait |

Fig. 5B

FIRST RAM

| DA1 | [Data] |
|---|---|
| 0 | A1 |
| 1 | B1 |
| 2 | A2 |
| 3 | B2 |

Fig. 6A

SECOND RAM

| DA2 | [Data] |
|---|---|
| 0 | hb1 |
| 1 | ha1 |
| 2 | hc1 |
| 3 | hb2 |
| 4 | ha2 |
| 5 | hc2 |

| STEP | PA1 | BRANCH PROCESSING | PS | DA1 | DA2 | PA2 | ARITHMETIC PROCESSING |
|---|---|---|---|---|---|---|---|
| 1 | 0 | PS<=3 | - | - | - | 0 | wait |
| 2 | 1 | PS<=8 | 3 | - | - | 0 | wait |
| 3 | 2 | start PA2=0 | 3 | - | - | 0 | wait |
| 4 | 3 | DA1=0 | 8 | - | - | 0 | wait |
| 5 | 4 | DA2=0 | 8 | 0 | - | 0 | wait |
| 6 | 5 | PA2=1 | 8 | 0 | 0 | 0 | wait |
| 7 | 6 | PS<=3 | 8 | 0 | 0 | 1 | R1=M1[DA1],R2=M2[DA2] |
| 8 | 7 | start PA2>=4 | 8 | 0 | 0 | 2 | R3=R1*R2,R1=X(n),R2=M2[++DA2],M1[DA1]=X(n) |
| 9 |  |  | 3 | 0 | 0 | 3 | R3=R1*R2,R4+=R3,R1=M1[++DA1],R2=M2[++DA2] |
| 10 | 8 | DA1=2 | 3 | 0 | 0 | 4 | R3=R1*R2,R4+=R3 |
| 11 | 9 | DA2=3 | 3 | 2 | 0 | 5 | R4+=R3 |
| 12 | 10 | PA2=1 | 3 | 2 | 3 | 6 | M1[DA1]=R4 |
| 13 | 11 | PS<=13 | 3 | 2 | 3 | 1 | R1=M1[DA1],R2=M2[DA2] |
| 14 | 12 | start PA2>=4 | 3 | 2 | 3 | 2 | R3=R1*R2,R1=X(n),R2=M2[++DA2],M1[DA1]=X(n) |
| 15 |  |  | 13 | 2 | 3 | 3 | R3=R1*R2,R4+=R3,R1=M1[++DA1],R2=M2[++DA2] |
| 16 | 3 | DA1=0 | 13 | 2 | 0 | 4 | R3=R1*R2,R4+=R3 |
| 17 | 4 | DA2=0 | 13 | 0 | 0 | 5 | R4+=R3 |
| 18 | 5 | PA2=1 | 13 | 0 | 0 | 6 | M1[DA1]=R4 |
| 19 | 6 | PS<=3 | 13 | 0 | 0 | 1 | R1=M1[DA1],R2=M2[DA2] |
| 20 | 7 | start PA2>=4 | 13 | 0 | 0 | 2 | R3=R1*R2,R1=X(n),R2=M2[++DA2],M1[DA1]=X(n) |
| 21 |  |  | 3 | 0 | 0 | 3 | R3=R1*R2,R4+=R3,R1=M1[++DA1],R2=M2[++DA2] |
| 22 | 13 | DA1=0 | 3 | 0 | 0 | 4 | R3=R1*R2,R4+=R3 |
| 23 | 14 | DA2=0 | 3 | 0 | 0 | 5 | R4+=R3 |
| 24 | 15 | PA2=8 | 3 | 0 | 0 | 6 | M1[DA1]=R4 |
| 25 | 16 | PS<=8 | 3 | 0 | 0 | 8 | nop |
| 26 | 17 | start PA2>=13 | 3 | 0 | 0 | 9 | nop |
| 27 |  |  | 8 |  | 0 | 10 | nop |
| 28 | 3 | DA1=0 | 8 | 0 | 0 | 11 | nop |
| 29 | 4 | DA2=0 | 8 | 0 | 0 | 12 | nop |
| 30 | 5 | PA2=1 | 8 | 0 | 0 | 13 | nop |
| 31 | 6 | PS<=3 | 8 | 0 | 0 | 1 | R1=M1[DA1],R2=M2[DA2] |

DIGITAL SIGNAL PROCESSOR

BACKGROUND OF THE INVENTION

1. Field of the Invention

The present invention relates to a digital signal processor with an improved arithmetic processing performance.

2. Description of the Background Art

In devices such as digital audio devices, a variety of digital filters are used for signal filtering processing. Such digital filters generally comprise a digital signal processor (DSP) including a plurality of registers combined with an adder and a multiplier.

Figure 8:
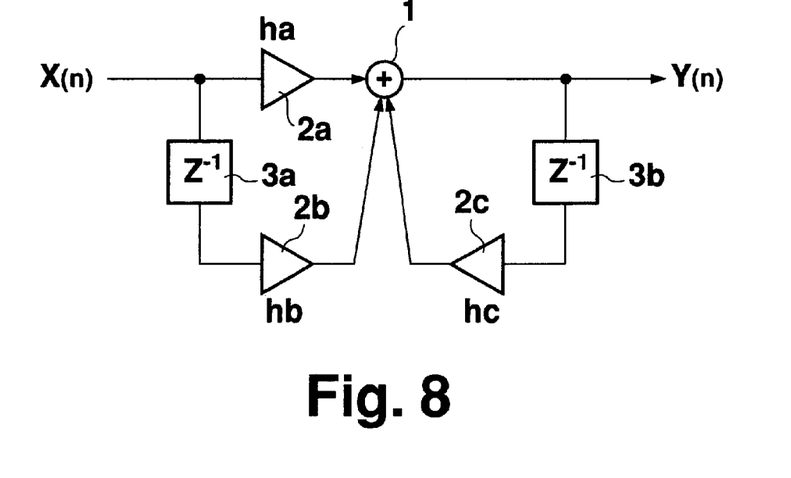
FIG. 8 is a circuit diagram showing a configuration of a digital filter.

FIG. 8 is a circuit diagram showing a typical configuration of a digital filter.

The digital filter comprises an adder 1, a first, a second, and a third multiplier 2a–2c, and a first and a second latch 3a, 3b. The first multiplier 2a multiplies an input digital data item X(a) by a first filter factor h(a). The first latch 3a latches and retains input digital data X(n) for one data period. The second multiplier 2b multiplies the immediately preceding digital data X(n-1) retained in the first latch 3a by the second filter factor hb. The second latch 3b holds digital data Y(n) output from the adder 1, and retains this data for one data period. The third multiplier 2c multiplies the immediately preceding digital data Y(n-1) retained in the second latch 3b by a third filter fact or hc. The adder 1 adds up the multiplication results output from the first to third multipliers 2a–2c, and outputs the sum as new digital data Y(n). Accordingly, with respect to the input digital data X(n), the output digital data Y(n) is generated according to the following equation:

$$Y(n)=X(n) \cdot ha+X(n-1) \cdot hb+Y(n-1) \cdot hc.$$

Figure 9:
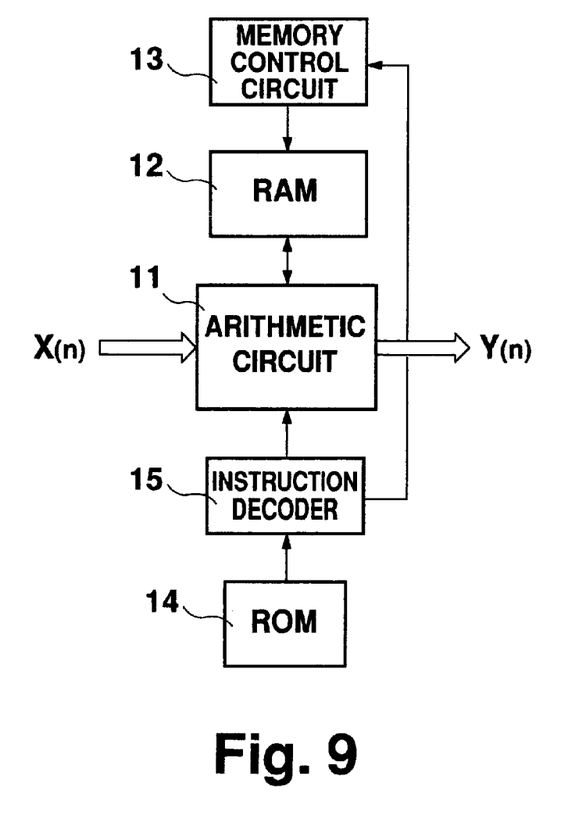
FIG. 9 is a block diagram illustrating a configuration of a conventional digital signal processor.

FIG. 9 is a block diagram illustrating a typical configuration of a digital signal processor.

The digital signal processor comprises an arithmetic circuit 11, a RAM 12, a memory control circuit 13, a ROM 14, and an instruction decoder 15. The arithmetic circuit 11 includes an adder and a multiplier. In response to instructions from the instruction decoder 15, the arithmetic circuit 11 performs various arithmetic processing on the input digital data X(n), intermediate data, and various factor data stored in the RAM 12, and then outputs the final calculation result as the digital data Y(n). The RAM 12 temporarily stores the digital data X(n) input into the arithmetic circuit 11, the digital data Y(n) output from the arithmetic circuit 11, and the intermediate data generated during the calculation processes in the arithmetic circuit 11. The RAM 12 also stores the various factor data. The memory control circuit 13, in response to instructions from the instruction decoder 15, reads out necessary data from the RAM 12 in accordance with the arithmetic operations of the arithmetic circuit 11, and supplies the data to the arithmetic circuit 11.

The ROM 14 stores a program that instructs the calculation procedures for the arithmetic circuit 11. The ROM 14 reads out each of the instructions in a predetermined sequence in accordance with a clock having a constant cycle, and supplies the instructions to the instruction decoder 15. The instruction decoder 15 interprets the instructions input from the ROM 14, and controls arithmetic operations of the arithmetic circuit 11. The instruction decoder 15 also controls read and write operations of the memory control circuit 13.

When putting the digital filter shown in FIG. 8 into actual practice, the ROM 14 contains, for example, a program executing the following arithmetic steps. In the following example, it is assumed that the immediately preceding data items X(n-1) and Y(n-1), and the filter factors ha, hb, and hc are stored in the RAM 12.

1) Read out the filter factor ha from the RAM 12. Multiply the input data X(n) by the filter factor ha, and store the product in the RAM 12. At the same time, store the data X(n) in the RAM 12.

2) Read out the immediately preceding data X(n-1) and the filter factor hb from the RAM 12, and multiply these items by each other. Store the product in the RAM 12.

3) Read out from the RAM 12 the product stored in step 1) and the product stored in step 2). Add these products, and store the sum in the RAM 12.

4) Read out the immediately preceding data Y(n-1) and the filter factor hc from the RAM 12, and multiply these items by each other. Store the product in the RAM 12.

5) Read out from the RAM 12 the sum stored in step 3) and the product stored in step 4), and add them together. Output the newly obtained sum as the data Y(n). At the same time, store the data Y(n) in the RAM 12.

In the above arithmetic operation, only one multiplication or addition processing is executed in each step. It is therefore not necessary to provide a plurality of multipliers or adders in the arithmetic circuit 11. The circuit configuration can therefore be simplified.

The control program stored in the ROM 14 generally comprises branch commands for instructing the calculation sequence and the sequence for reading out each data (including factors), and arithmetic commands for executing the actual calculations such as multiplication and addition. These branch commands and arithmetic commands are stored in the ROM 14 in an intermingled state in a predetermined sequence. These instructions are read out from the ROM 14 in a predetermined sequence and supplied to the instruction decoder 15. This means that, when the signal processing is more complex or has more arithmetic steps, the size of the control program becomes larger and the time required for the signal processing grows long.

SUMMARY OF THE INVENTION

In light of the above, an object of the present invention is to prevent the signal processing time from becoming longer when the number of arithmetic steps are increased.

According to the present invention created for solving the above problem, there is provided a digital signal processor performing a plurality of stages of arithmetic processing on first digital data to generate second digital data, comprising a first memory for storing branch commands controlling a sequential flow of said plurality of stages of arithmetic processing; a second memory for storing arithmetic commands controlling operation in each of said plurality of stages of arithmetic processing; a first memory control circuit for designating addresses in each of said first and said second memories in a fixed sequence and for reading out said branch commands and said arithmetic commands; and an arithmetic circuit for performing arithmetic processing on said first digital data according to said branch commands and said arithmetic commands read out from said first and said second memories; wherein said first memory control circuit jumps to a predetermined address within the addresses of said second memory in response to said branch commands.

According to the present invention, branch commands and arithmetic commands can be processed simultaneously, permitting execution of increased number of steps in a short period of time.

The present digital signal processor can preferably be used as a digital filter for a digital audio device.

BRIEF DESCRIPTION OF THE DRAWINGS

The present invention will be further understood from the following description with reference to the accompanying drawings in which.

DESCRIPTION OF PREFERRED EMBODIMENT

Figure 1:
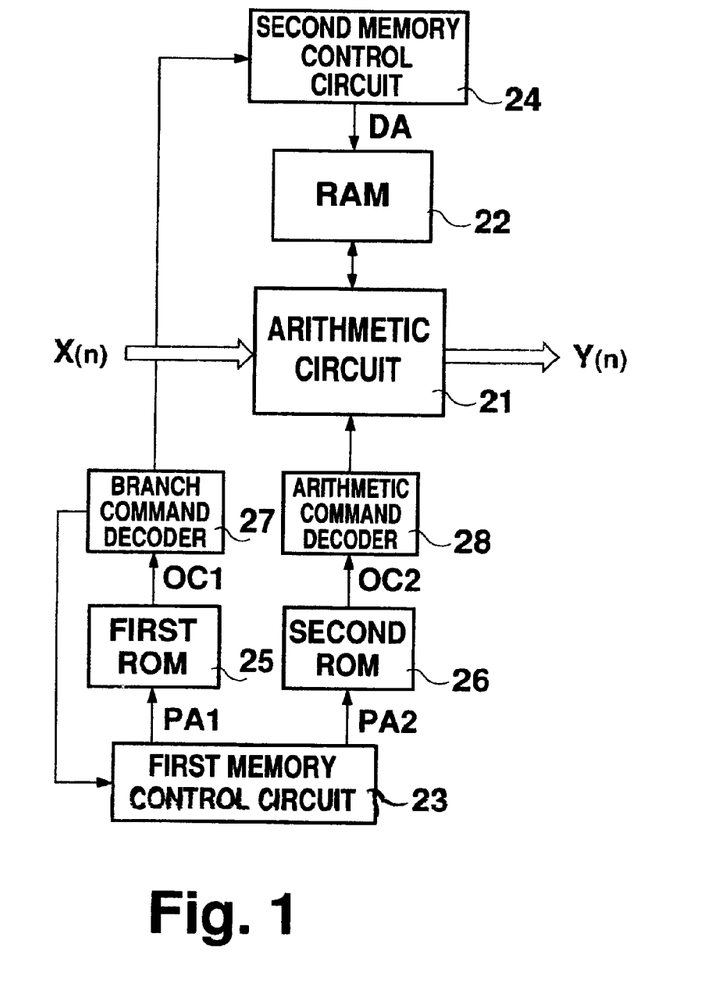
FIG. 1 is a block diagram illustrating a configuration of a digital signal processor of the present invention.
Figure 2:
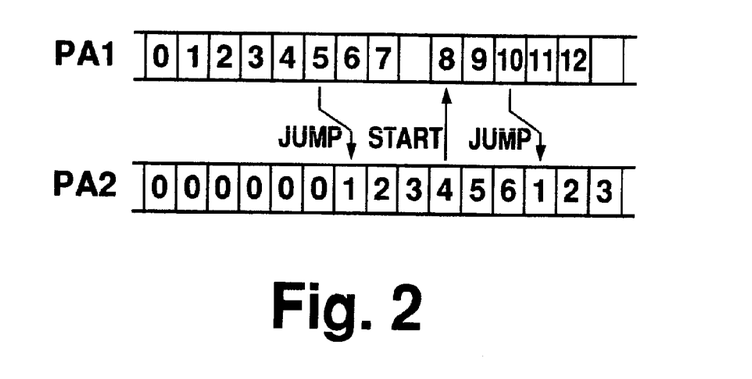
FIG. 2 is a timing chart showing an example operation of the digital signal processor of the present invention.

FIG. 1 is a block diagram illustrating a configuration of a digital signal processor of the present invention. FIG. 2 is a timing chart showing changes in program addresses in an operation example of the digital signal processor shown in FIG. 1.

The digital signal processor comprises an arithmetic circuit 21, a RAM 22, a first and a second memory control circuit 23,24, a first and a second ROM 25,26, a branch command decoder 27, and an arithmetic command decoder 28.

The arithmetic circuit 21 includes an adder and a multiplier, and performs various arithmetic processing on the input digital data X(n) and intermediate data stored in the RAM 22 in response to the instructions from the arithmetic command decoder 28. This arithmetic circuit 21 is equivalent to the arithmetic circuit 11 shown in FIG. 9. The final calculation result is output as the digital data Y(n).

The RAM 22 stores the digital data X(n) input to the arithmetic circuit 21, the digital data Y(n) output from the arithmetic circuit 21, the intermediate data generated during the calculation processes in the arithmetic circuit 21, and the various factor data. In response to the instructions from the branch command decoder 27 described below, the second memory control circuit 24 supplies to RAM 22 the data addresses for designating data required for the arithmetic operations in the arithmetic circuit 21. In this way, the desired data are read out from the RAM 22 and incorporated into each of the arithmetic processing in the arithmetic circuit 21.

The first ROM 25 mainly stores the branch commands included in the program instructing the calculation steps, while the second ROM 26 mainly stores the arithmetic commands among the calculation steps. In response to a clock having a constant cycle and to instructions from the branch command decoder 27 described below, the first memory control circuit 23 generates a program address PA1 for designating a branch command program. Simultaneously, in synchronization with program address PA1, the first memory control circuit 23 generates a program address PA2 for designating an arithmetic command program. Regarding program addresses PA1,PA2, the initial values are set in response to instructions from the branch command decoder 27, and each of the program addresses are then sequentially incremented in response to a clock having a constant cycle.

As shown in FIG. 2, for example, during the process of sequentially incrementing program address PA1, a jump instruction is generated at the point of reaching "5", thereby starting the increment operation of program address PA2. Program address PA1 temporarily stops its increment operation at the point of reaching "7" in order to match its timing with program address PA2. Program address PA1 waits until a start instruction is given at the point that program address PA2 reaches "4". In this way, by the time that program address PA1 reaches "10" and another jump instruction is provided to program address PA2, program address PA2 has reached "6".

The branch command decoder 27 interprets the branch commands OC1 read out from the first ROM 25. The branch command decoder 27 then provides instructions to the first memory control circuit 23 for determining calculation sequence and the like. To the second memory control circuit 24, the branch command decoder 27 provides instructions for designating data in accordance with each of the arithmetic processing. The arithmetic command decoder 28 interprets the arithmetic commands OC2 read out from the second ROM 26, and provides instructions to the arithmetic circuit 21 for executing various calculations.

In the above-described digital signal processor, the first ROM 25 and the second ROM 26 are provided in parallel, together with the branch command decoder 27 and the arithmetic command decoder 28. The branch commands and the arithmetic commands can therefore be simultaneously executed while matching each other's timing. Accordingly, the number of steps that can be processed in a period of time is doubled compared to the case wherein the branch commands and the arithmetic commands are stored in an intermingled state in one ROM.

Figure 3:
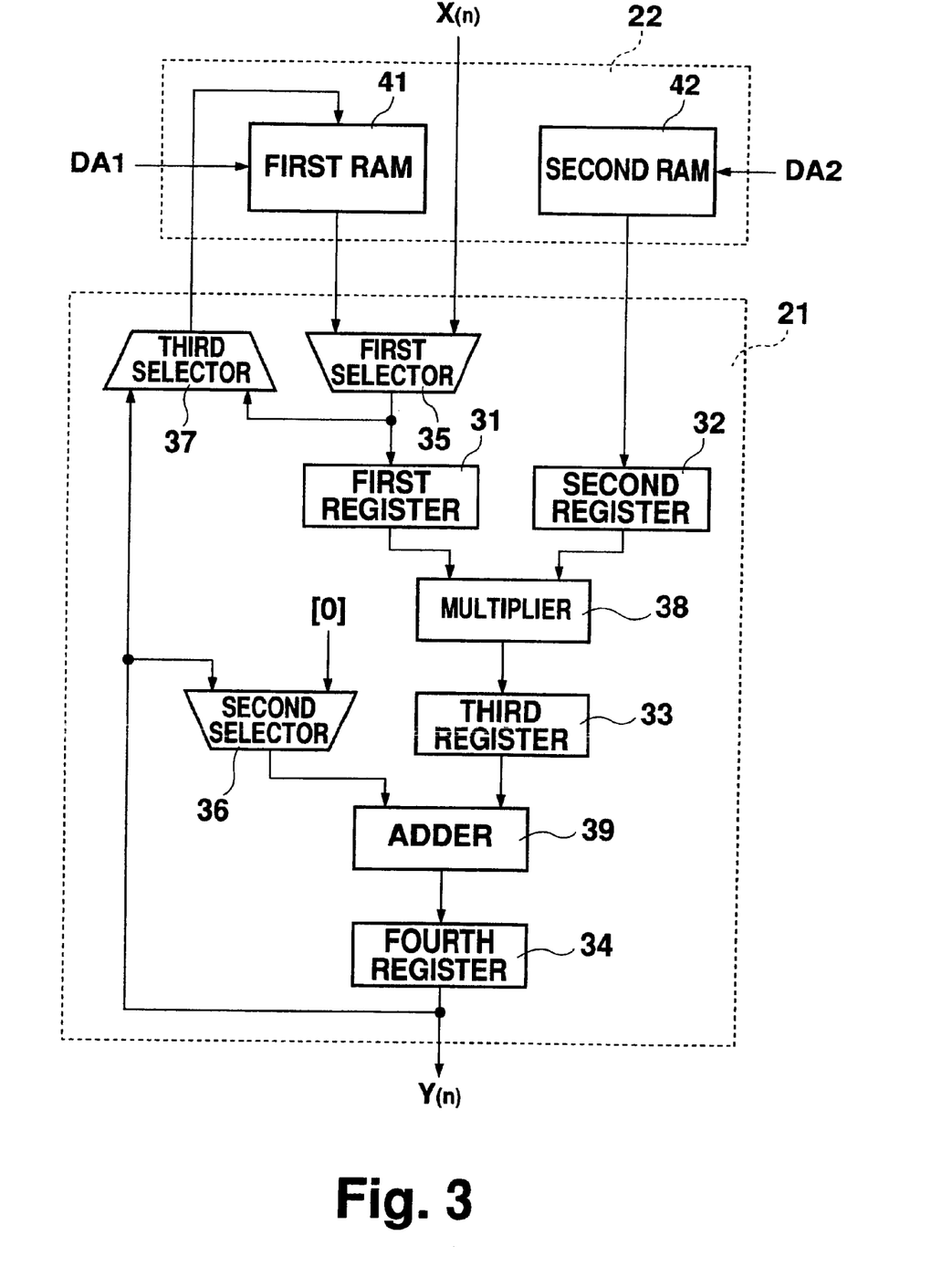
FIG. 3 is a block diagram illustrating an example configuration of an arithmetic circuit and a RAM.
Figure 4:
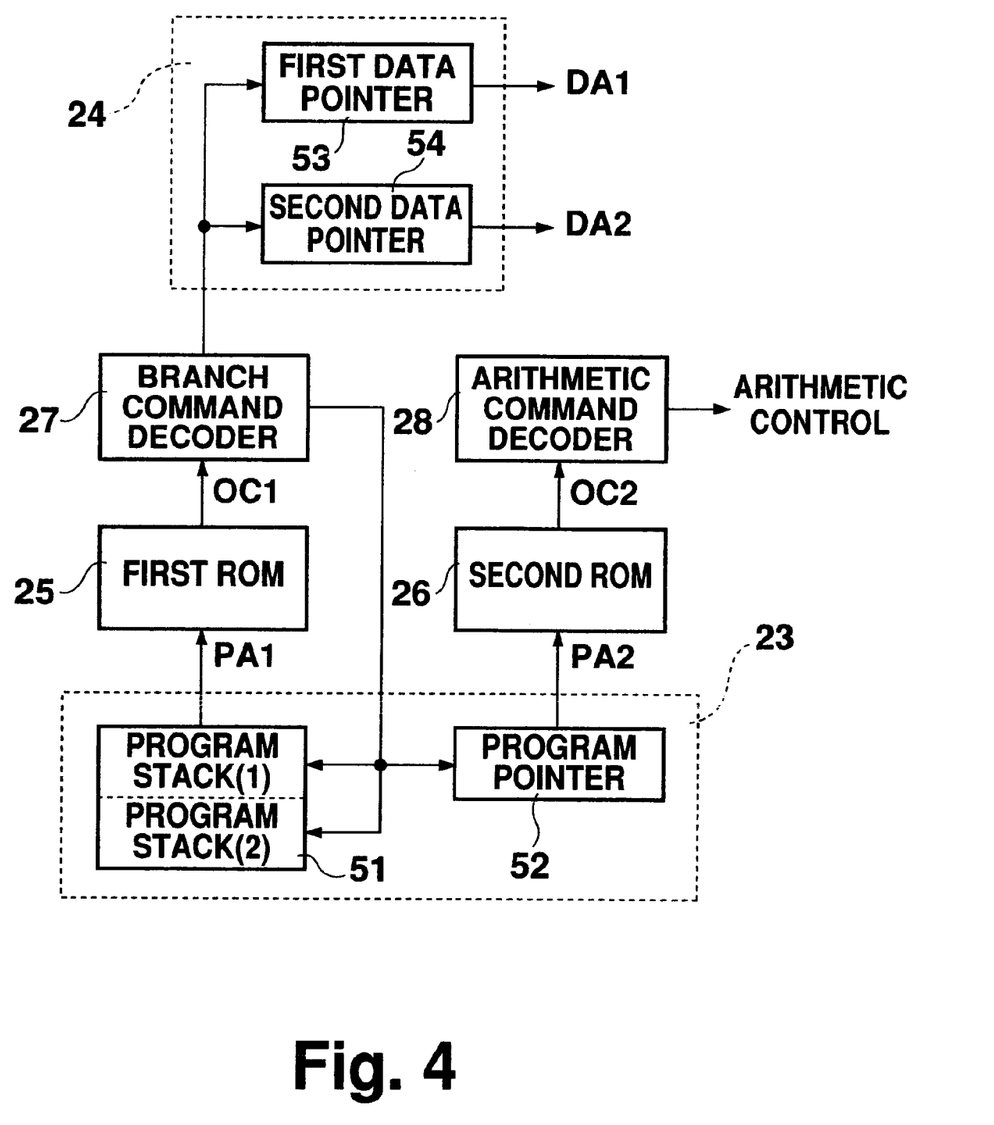
FIG. 4 is a block diagram illustrating an example configuration of a memory control circuit.

FIG. 3 is a block diagram illustrating an example configuration of the arithmetic circuit 21 and the RAM 22. FIG. 4 is a block diagram illustrating a configuration example of the first memory control circuit 23 and the second memory control circuit 24.

The arithmetic circuit 21 comprises first to fourth registers 31–34, first to third selectors 35–37, a multiplier 38, and an adder 39. The RAM 22 includes a first RAM 41 and a second RAM 42.

The first RAM 41 stores the input data X(n), the output data Y(n), and the intermediate data generated during the calculation processes. The second RAM 42 stores the various factor data. These RAM 41,42 perform read and write operations of each data item in response to data addresses DA1,DA2 supplied by the second memory control circuit 24.

The first RAM 41 and an external input unit connect to the first selector 35. The first selector 35 selects either the data read out from the first RAM 41 or the externally input data X(n), and then outputs the selected data. The first selector 35 connects to the first register 31 which receives and retains the data selected by the first selector 35. The second RAM 42 connects to the second register 32 which receives and retains the data read out from the second RAM 42. The first register 31 and the second register 32 connect to the multiplier 38. The multiplier 38 multiplies the data items retained in the registers 31,32 by each other, and outputs the product. The third register 33, which is connected with the multiplier 38, receives and retains the product input from the multiplier 38. The fourth register 34 and the data "0" connect to the second selector 36. The second selector 36 selects either the data retained in the fourth register 34 or "0", and then outputs the selected data item. The third register 33 and the second selector 36 connect to the adder 39. The adder adds the data retained in the third register 33 and the data selected in the second selector 36, and outputs the sum. The adder 39 connects to the fourth register 34 which receives and retains the sum input from the adder 39. The third selector 37 is connected with the first selector 35 and the fourth register 34. The third selector 37 selects either the data selected in the first selector 35 or the data retained in the fourth register 34, and outputs the selected data. The data selected in the third register 37 is supplied to the first RAM 41 and written in the address designated by data address DA1.

In the above-described arithmetic circuit 21, the select operations of each of the selectors 35–37 follow the instructions from the arithmetic command decoder 28 described below. The receive operations of each of the registers 31–34 are controlled in accordance with the reference clock having a constant cycle.

The first memory control circuit 23 includes a program stack 51 and a program pointer 52. The program stack 51 is a FIFO (first in first out) type register having two regions (1) and (2) for storing two separate address values of program address PA1. The first region (1) sequentially receives program address PA1 supplied from the branch command decoder 27, and transfers the address value to the second region (2) at a predetermined timing. The second region (2) has an incrementing function, and, using program address PA1 received from the first region (1) as the starting value, repeatedly outputs program address PA1 while adding "1", in each cycle according to the reference clock so as to synchronize with the operations of each of the registers 31–34 in the arithmetic circuit 21. The program pointer 52 comprises registers having an incrementing function. The program pointer 52 stores program address PA2 supplied from the branch command decoder 27, and, using this program address PA2 as the starting value, repeatedly outputs program address PA2 while adding "1" in each cycle according to the reference clock, in a manner similar to the program stack 51. With this arrangement, the programs stored in respective addresses of the ROM 25,26 are sequentially read out according to instructions from the branch command decoder 27, starting with program addresses PA1, PA2 supplied from the branch command decoder 27. In this first memory control circuit 23, the transfer of program address PA1 from the first region (1) to the second region (2) of the program stack 51 and the operation for updating program address PA1 are executed at a timing according to instructions from the branch command decoder 27.

The second memory control circuit 24 includes the first data pointer 53 and the second data pointer 54. The first data pointer 53 stores data address DA1 supplied by the branch command decoder 27. The second data pointer 54 stores data address DA2 similarly supplied by the branch command decoder 27. After supplying the stored data addresses DA1, DA2 to the RAM 22, the contents of these data pointers 53,54 are updated by the newly supplied data addresses DA1,DA2 from the branch command decoder 27. In this second memory control circuit 24, the operation for updating data addresses DA1,DA2 is executed at a timing according to instructions from the branch command decoder 27 in a manner similar to the first memory control circuit 23.

According to the above arrangement, simultaneous with the branch commands read out from the first ROM 25 being supplied to the first memory control circuit 23 and the second memory control circuit 24, the arithmetic commands read out from the second ROM 26 are supplied to the arithmetic circuit 21. The branch processing and the arithmetic processing thus proceed in parallel, thereby improving calculation efficiency.

Figure 5A:
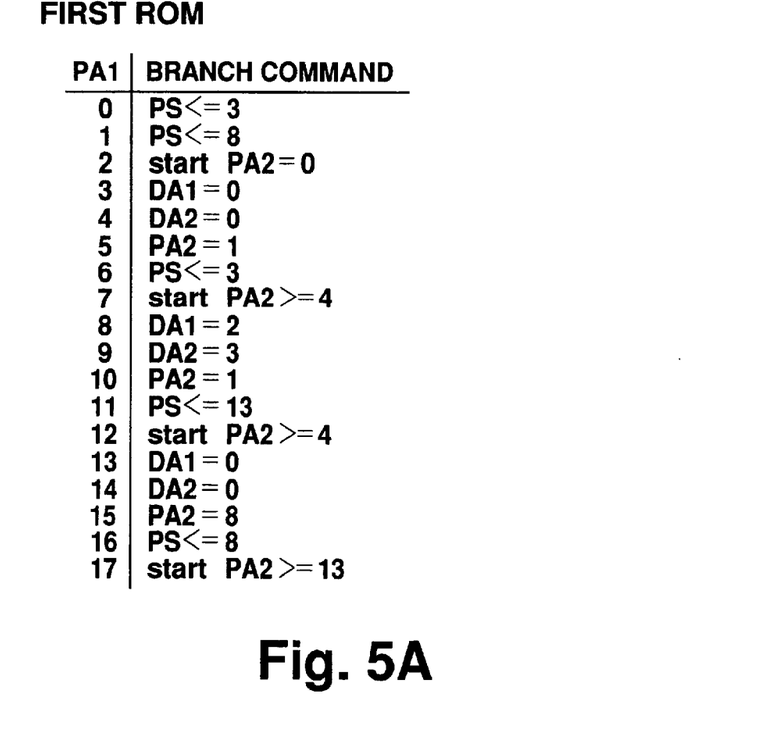
FIGS. 5A and 5B show program lists of branch commands and arithmetic commands.
Figure 5B:
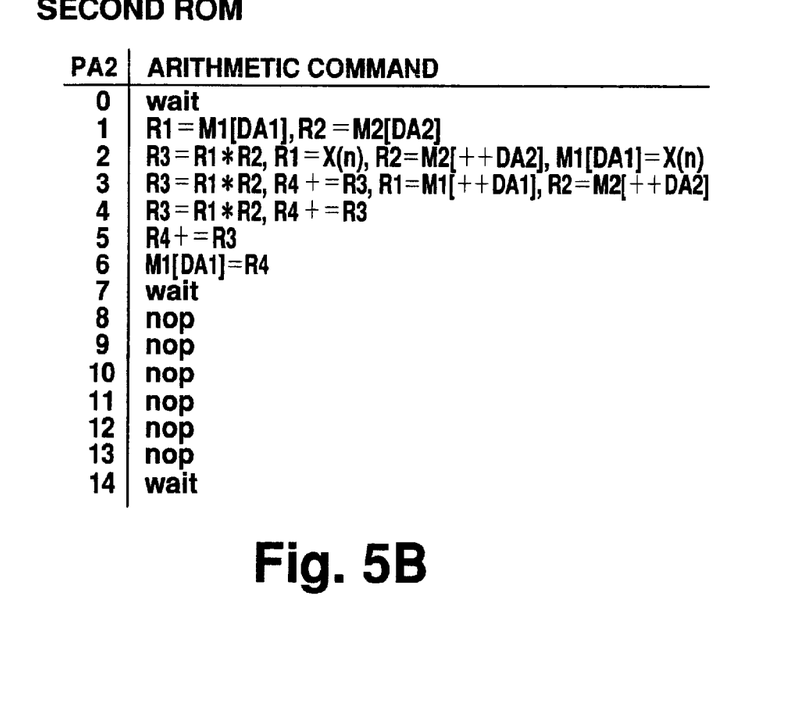
Figure 6A:
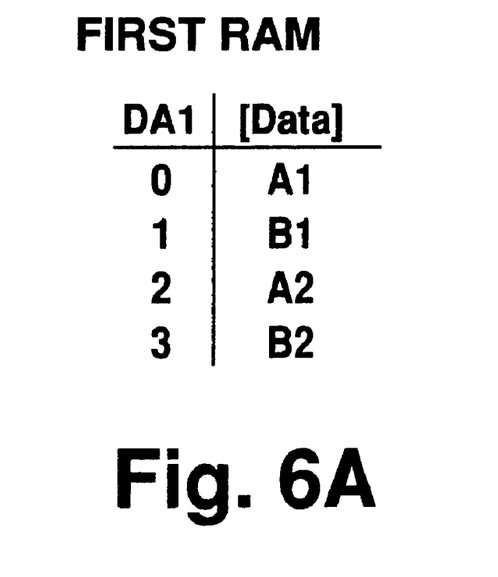
FIGS. 6A and 6B show tables indicating the content of the RAM.
Figure 6B:
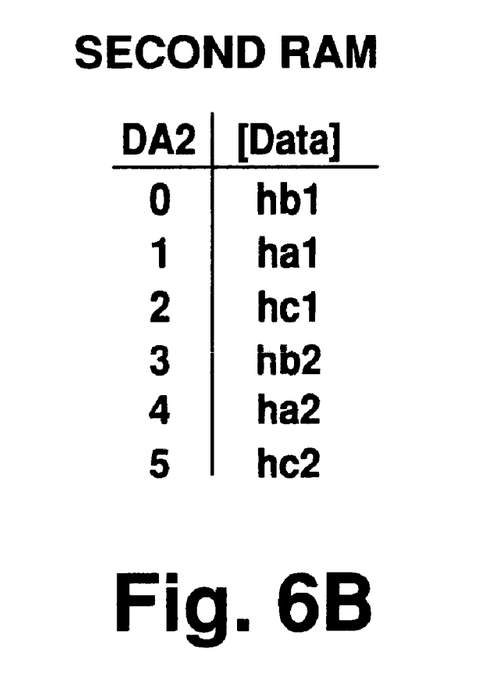

FIGS. 5A and 5B show lists of control programs for operating the digital signal processor of the present invention as a digital filter illustrated in FIG. 8. FIGS. 6A and 6B show lists indicating the content of the RAM storing the intermediate data and the factor data corresponding to the control programs shown in FIGS. 5A and 5B.

The first ROM 25 includes addresses 0–17 as program address PA1. In each of the addresses, branch commands as shown in FIG. 5A are stored. These branch commands instruct the following operations.

PS<=n: Set address "n" in the program stack 51.

Start PA2=n: When program address PA2 is "n", receive program address PA1 from the program stack 51 and start operation.

DA1=n: Set address "n" in the first data pointer 53.

DA2=n: Set address "n" in the second data pointer 54.

PA2=n: Set address "n" in the program pointer 52.

The second ROM 26 includes addresses 0–14 as program address PA2. In each of the addresses, arithmetic commands as shown in FIG. 5B are stored. These arithmetic commands instruct the following operations.

R1=M1[DA1]: Read out data from the address DA1 of the first RAM 41 and store the data in the first register 31.

R2=M2[DA2]: Read out data from the address DA2 of the second RAM 42 and store the data in the second register 32.

R3=R1 * R2: Multiply the data in the first register 31 and the data in the second register 32 by each other, and store the product in the third register 33.

R1=X(n): Store the input data X(n) in the first register 31.

R2=M2 [++DA2]; Update DA2 by adding "1", then read out data from the address DA2 of the second RAM 42 and store the data in the second register 32.

M1[DA1]=X(n): Write the input data X(n) into the address DA1 of the first RAM 41.

R4+=R3: Add the data in the third register 33 to the data in the fourth register 34, and store the sum in the fourth register 34.

R1=M1 [++DA1]: Update DA1 by adding "1", then read out data from the address DA1 of the first RAM 41 and store the data in the first register 31.

M1[DA1]=R4: Write the data in the fourth register 34 into the address DA1 of the first RAM 41.

Instructions for operations that can be executed simultaneously in the arithmetic circuit 21 are stored in the same address so that all such operations are executed in a single step.

The first RAM 41 includes addresses 0–3 as data address DA1. Each of the addresses stores the first intermediate data A1,B1 and the second intermediate data A2,B2, respectively, as shown in FIG. 6A. These intermediate data A1,B1,A2,B2 are sequentially rewritten according to arithmetic commands. The second RAM 42 includes addresses 0–5 as data address DA2. Each of the addresses stores the filter factors hb1,ha1,hc1,hb2,ha2,hc2. These filter factors are not rewritten by arithmetic commands, but are configured to be rewritable so that the digital filter characteristics can be changed.

Figure 7:
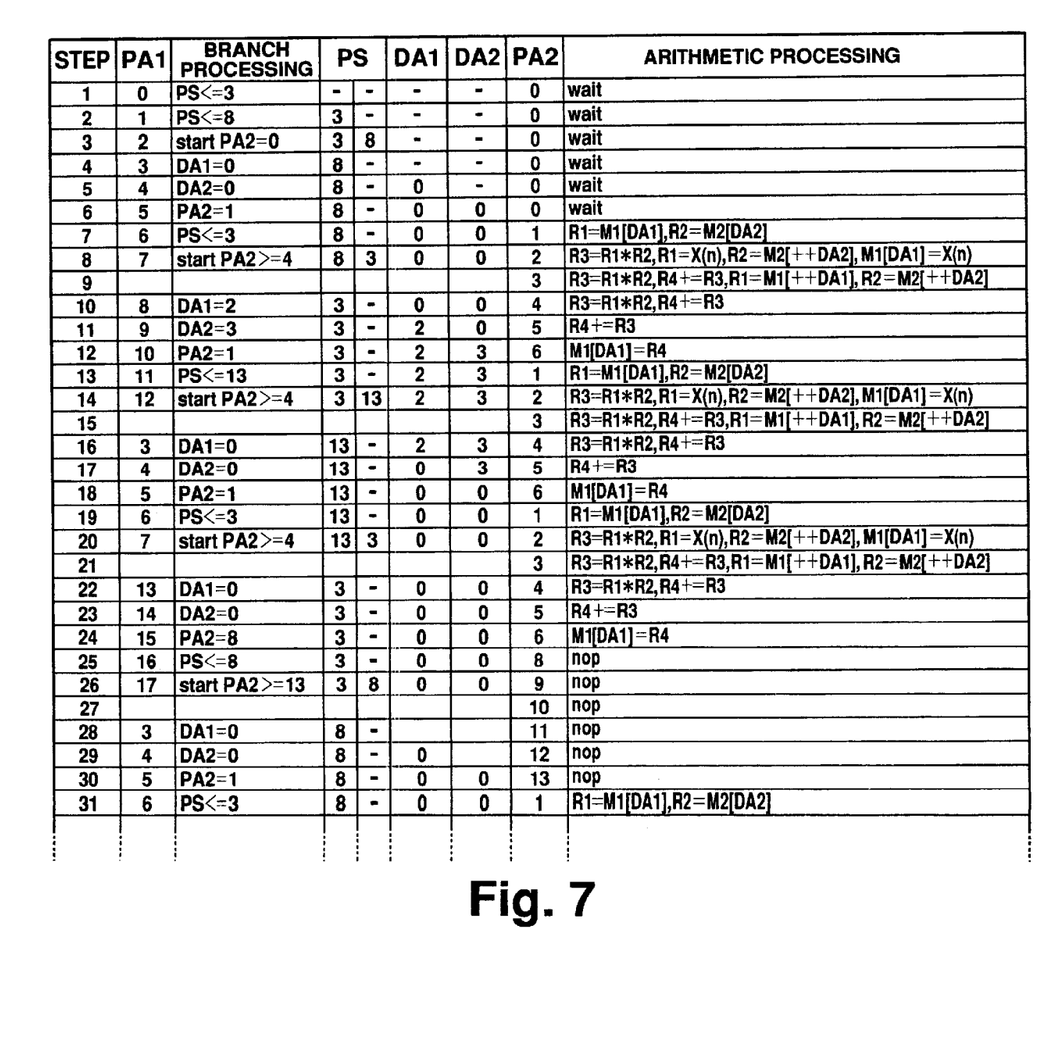
FIG. 7 is a table explaining the arithmetic processing according to the program lists of FIGS. 5A and 5B.

The operation of the digital signal processor of the present invention according to the above control program is described next while referring to FIG. 7. The following operation illustrates three stages of filtering processes, wherein a filtering process having a first characteristic, a different filtering process having a second characteristic, and again a filtering process having the first characteristic are executed.

In step 1, each of program addresses PA1 and PA2 is set at "0", and the branch commands and the arithmetic commands stored in address 0 of the first ROM 25 and the second ROM 26 are executed. By this step, "3" is set as program address PA1 in the program stack 51. At this time, program address PA2 is maintained at "0". When program address PA1 is set at "1" in step 2, the branch command stored in address 1 of the first ROM 25 is executed, thereby setting "3" as program address PA1 in the program stack 51. When program address PA1 is set at "2" in step 3, the branch command stored in address 2 of the first ROM 25 is executed. As program address PA2 is maintained at "0", "3" is immediately read out as program address PA1 from the program stack 51, and operation is started with "3" as program address PA1. At this point, upon reading out "3" from the program stack 51, "8" stored in the second region (2) is transferred to the first region (1).

While program address PA1 sequentially shifts from "3" to "5" in steps 4–6, the branch commands stored in addresses 3–5 of the first ROM 25 are sequentially executed. With these steps, "0", "0", and "1" are set as data address DA1, data address DA2, and program address PA2, respectively.

When program address PA1 reaches "6" in step 7, the branch command stored in address 6 of the first ROM 25 is executed, thereby setting "3" as program address PA1 in the program stack 51. At this point, as "1" has been set in the program pointer 52 by step 6, the arithmetic command stored in address 1 of the second ROM 26 is executed. Accordingly, intermediate data A1 read out from address 0 of the first RAM 41 is stored in the first register 31, and the filter factor hb1 read out from address 0 of the second RAM 42 is stored in the second register 32. At this point, intermediate data A1 is the immediately preceding input data X(n−1).

When program address PA1 is set at "7" in step 8, the branch command stored in address 7 of the first ROM 25 is executed, stopping operation of program address PA1 until program address PA2 reaches "4". In this step, program address PA2 reaches "2", executing the arithmetic command stored in address 2 of the second ROM 26. Accordingly, the product of intermediate data A1 stored in the first register 31 (the immediately preceding input data X(n−1)) and the filter factor hb1 stored in the second register 32, namely, [hb1·X (n−1)], is stored in the third register 33. In addition, the first register 31 stores the input data X(n), and the second register 32 stores the filter factor ha1 read out from address 1 of the second RAM 42. Furthermore, in preparation for the succeeding arithmetic processing, the input data X(n) is newly written into address 0 of the first RAM 1 as intermediate data A1.

In step 9, the operation of program address PA1 remains stopped. only program address PA2 is updated to "3", executing the arithmetic command stored in address 3 of the second ROM 26. By this step, the product of the data X(n) stored in the first register 31 and the filter factor ha1 stored in the second register 32, namely, [ha1·X(n)], is stored in the third register 33. Moreover, the product [hb1·X(n−1)] that was stored in the third register 33 up to this point is added to the data stored in the fourth register 34, and the sum is stored in the fourth register 34. As "0" is initially stored in the fourth register 34, the product [hb1·X(n−1)] previously stored in the third register 33 is stored in the fourth register 34 without any change. In addition, the first register 31 stores intermediate data B1 read out from address 1 of the first RAM 41, and the second register 32 stores the filter factor hc1 read out from address 2 of the second RAM 42. At this point, the intermediate data B1 is the immediately preceding output data Y(n−1).

In step 10, program address PA2 reaches "4", executing the arithmetic program stored in address 4 of the second ROM 26. By this step, the product of intermediate data B1 stored in the first register 31 (the immediately preceding output data Y(n−1)) and the filter factor hc1 stored in the second register 32, namely, [hc1·Y(n−1)], is stored in the third register 33. Moreover, the product [ha1·X(n)] that was stored in the third register 33 up to this point is added to the product [hb1·X(n−1)] stored in the fourth register 34, and the sum [ha1·X(n)+hb1·X(n−1)] is newly stored in the fourth register 34. In addition, as program address PA2 is now at "4", "8" is read out as program address PA1 from the program stack 51, and operation is started with program address PA1 at "8". Accordingly, the branch command stored in address 8 of the first ROM 25 is executed, setting "2", as data address DA1 in the first data pointer 53.

In step 11, program address PA1 reaches "9", executing the branch command stored in address 9 of the first ROM 25. At the same time, program address PA2 is set at "5", executing the arithmetic command stored in address 5 of the second ROM 26. By this step, "3" is set as data address DA2 in the second data pointer 54. Furthermore, the product [hc1·Y(n−1)] stored in the third register 33 is added to the sum [ha1·X(n)+hb1·X(n−1)] stored in the fourth register 34, and the obtained sum [ha1·X(n)+hb1 X(n−1) +hc1·Y(n−1)] is newly stored in the fourth register 34.

In step 12, program address PA1 reaches "10", and the branch command stored in address 10 of the first ROM 25 is executed. At the same time, program address PA2 is set at "6", executing the arithmetic command stored in address 6 of the second ROM 26. By this step, "1" is set as program address PA2 in the program pointer 52. Moreover, in preparation for the succeeding processing, the sum [ha1·X(n)+hb1·X(n−1)+hc1·Y(n−1)] stored in the fourth register 34 is written into address 1 of the first RAM as intermediate data B1. In this step 12, instead of employing data address DA1 set in the first data pointer 53, data address DA1 at the time of that intermediate data B1 was read out in step 9, namely, "1", is employed.

In step 13, program address PA1 reaches "11", executing the branch command stored in address 11 of the first ROM 25. By this step, "13" is set as program address PA1 in the program stack 51. At this point, program address PA2 is at "1" as set by step 12, executing the arithmetic command stored in address 1 of the second ROM 26. This arithmetic command is the same as the one executed in step 7. Intermediate data A2 read out from the first RAM 41 is stored in the first register 31, and the filter factor hb2 read out from the second RAM 42 is stored in the second register 32.

As described above, arithmetic processing according to the arithmetic commands provided in steps 7–12 is performed based on the conditions set by the branch commands provided in steps 4–8. As a result, the filtering process according to the following equation is completed:

$$Y(n)=ha1\cdot X(n)+hb1\cdot X(n-1)+hc1\cdot Y(n-1).$$

This equation corresponds to the arithmetic processing accomplished by the digital filter shown in FIG. 8.

Subsequently, in a manner similar to the above, arithmetic processing according to the arithmetic commands provided in steps 13–18 is performed based on the conditions set by the branch commands provided in steps 10–14. As a result, the filtering process according to the following equation is completed:

$$Y(n)=ha2\cdot X(n)+hb2\cdot X(n-1)+hc2\cdot Y(n-1).$$

Furthermore, arithmetic processing according to the arithmetic commands provided in steps 19–24 is performed using the conditions set by the branch commands provided in steps 16–20. This processing accomplishes a filtering process having characteristics identical to the processing completed by the steps up to step 12.

When program address PA2 is set at "4" in step 22, "13" is received as program address PA1 from the program stack 51, executing the branch command stored in address 13 of the first ROM 25. By this step, "0" is set as data address DA1 in the first data pointer 53. In step 23, program address PA1 is set at "14", executing the branch command in address 14 of the first ROM 25. This step sets "0" as data address DA2 in the second data pointer 54. In step 24 wherein program address PA1 reaches "15" and the branch command stored in address 15 of the first ROM 25 is executed, "8" is set as program address PA2 in the program pointer 52.

In step 25, program address PA1 is set at "16", executing the branch command stored in address 16 of the first ROM 25. By this step, "8" is set as program address PA1 in the program stack 51. At this point, as program address PA2 has been set at "8", by step 24, no arithmetic operation is executed.

In step 26, when program address PA1 reaches "17", the branch command in address 17 of the first ROM 25 is executed, stopping operation of program address PA1 until program address PA2 is set at "11". At this point, program address PA2 is set at "9", but no arithmetic operation is performed. Subsequently, when program address PA2 reaches "11" (in step 28), "3" is read out from the program stack 51 as program address PA1, executing the branch command stored in address 3 of the first ROM 25. The operation in the steps after this step 28 is identical to the operation starting from step 4. The three stages of the filtering processes are repeated accordingly.

The above description illustrates a case wherein two kinds of filtering processes are executed in three stages. However, by modifying the control program of branch commands and arithmetic commands, it is possible to perform more complex filtering processes without changing the circuit configuration. Processing can efficiently be completed even when involving such more complex filtering processes because, as in the above embodiment, branch commands and arithmetic commands are similarly processed in parallel.

According to the present invention, by storing the branch commands and the arithmetic commands separately in the memory, branch processing and arithmetic processing in digital signal processing can be executed simultaneously. The arithmetic circuit is thereby made more efficient, and the time required for arithmetic processing is reduced.

What is claimed is:

1. A digital signal processor performing a plurality of stages of arithmetic processing on first digital data to generate second digital data, comprising:

a first memory for storing a first set of branch commands controlling a sequential flow of said plurality of stages of arithmetic processing;

a second memory for storing a second set of arithmetic commands controlling operation in each of said plurality of stages of arithmetic processing;

a first memory control circuit for designating addresses in each of said first and second memories in a fixed sequence, and reading out said branch commands and said arithmetic commands; and an arithmetic circuit for performing arithmetic processing on said first digital data according to said branch commands and said arithmetic commands read out from said first and said second memories; wherein said first memory control circuit jumps to a predetermined address within the addresses of said second memory in response to said branch commands.

2. The digital signal processor defined in claim 1, wherein:

said first memory control circuit reads out from said first memory in advance said branch commands corresponding to an appropriate number of subsequent steps and temporarily retains said branch commands; and said first memory control circuit comprises a FIFO type program stack for outputting said branch commands in a sequence in which said branch commands were retained.

3. The digital signal processor defined in claim 1, wherein:

said first memory control circuit delays readout of said branch commands from said first memory in accordance with the addresses for readout of said arithmetic commands from said second memory.

4. The digital signal processor defined in claim 1 further comprising:

a third memory for storing, in addition to said first and said second digital data, intermediate data generated during said processing by said arithmetic circuit; and a second memory control circuit for designating addresses in said third memory according to said branch commands and said arithmetic commands.

5. The digital signal processor defined in claim 4, wherein:

said second memory control circuit designates an initial address based on said branch commands, and sequentially updates said initial address based on said arithmetic commands.

6. A digital signal processor performing a plurality of stages of arithmetic processing on first digital data to generate second digital data, comprising:

a first memory for storing branch commands controlling a sequential flow of said plurality of stages of arithmetic processing, said branch commands being accessed with first address data;

a second memory for storing arithmetic commands controlling operation in each of said plurality of stages of arithmetic processing, said arithmetic commands being accessed with second address data;

a first memory control circuit for generating said first and second address data for designating addresses in said first and second memories, respectively, in a fixed sequence, and reading out said branch commands and said arithmetic commands; and an arithmetic circuit for performing arithmetic processing on said first digital data according to said branch commands and said arithmetic commands read out from said first and said second memories; wherein said first memory control circuit jumps to a predetermined address within the addresses of said second memory in response to said branch commands.

* * * * *

UNITED STATES PATENT AND TRADEMARK OFFICE
CERTIFICATE OF CORRECTION

PATENT NO. : 6,430,681 B1  
APPLICATION NO. : 09/336075  
DATED : August 6, 2002  
INVENTOR(S) : Fumiaki Nagao Page 1 of 1

It is certified that error appears in the above-identified patent and that said Letters Patent is hereby corrected as shown below:

Column 6,  
Line 43, after "[++DA2]" delete ";" and insert therefor -- : --.

Column 7,  
Line 65, after "stopped." delete "only" and insert therefor -- Only--.

Column 8,  
Line 30, after "+hb1" insert -- • --.

Column 9,  
Line 13, after "+hc2" delete "." and insert therefor -- • --.

Signed and Sealed this

Twenty-fifth Day of December, 2007

JON W. DUDAS  
*Director of the United States Patent and Trademark Office*

UNITED STATES PATENT AND TRADEMARK OFFICE
CERTIFICATE OF CORRECTION

PATENT NO. : 6,430,681 B1  Page 1 of 1
APPLICATION NO. : 09/336075
DATED : August 6, 2002
INVENTOR(S) : Fumiaki Nagao It is certified that error appears in the above-identified patent and that said Letters Patent is hereby corrected as shown below:

Column 6,
Line 43, after "[++DA2]" delete ";" and insert therefor -- : --.

Column 7,
Line 65, after "stopped." delete "only" and insert therefor -- Only --.

Column 8,
Line 30, after "+hb1" insert -- • --.

Column 9,
Line 13, after "+hc2" delete "-" and insert therefor -- • --.

This certificate supersedes the Certificate of Correction issued December 25, 2007.

Signed and Sealed this

Sixth Day of October, 2009

David J. Kappos
*Director of the United States Patent and Trademark Office*